United States Patent
Schneider et al.

(10) Patent No.: US 8,448,508 B2
(45) Date of Patent: May 28, 2013

(54) HOT FILM AIR MASS METER AND METHOD FOR ITS MANUFACTURE

(75) Inventors: Norbert Schneider, Tiefenbronn (DE); Hans Hecht, Stuttgart (DE); Uwe Konzelmann, Asperg (DE); Lutz Westenberger, Remseck (DE); Bernd Kuenzl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 12/451,585

(22) PCT Filed: Apr. 4, 2008

(86) PCT No.: PCT/EP2008/054080
§ 371 (c)(1),
(2), (4) Date: Mar. 29, 2010

(87) PCT Pub. No.: WO2008/145445
PCT Pub. Date: Dec. 4, 2008

(65) Prior Publication Data
US 2010/0180675 A1    Jul. 22, 2010

(30) Foreign Application Priority Data
May 29, 2007  (DE) .......................... 10 2007 024 865

(51) Int. Cl.
*G01F 1/68* (2006.01)
(52) U.S. Cl.
USPC ...................................... 73/204.26
(58) Field of Classification Search
USPC ...................................... 73/204.26
See application file for complete search history.

(56) References Cited

U.S. PATENT DOCUMENTS

| | | | | |
|---|---|---|---|---|
| 5,693,879 A | * | 12/1997 | Rilling et al. .............. | 73/114.34 |
| 6,591,675 B1 | * | 7/2003 | Doderer et al. ............ | 73/204.22 |
| 7,150,189 B2 | | 12/2006 | Tanaka et al. | |
| 7,404,321 B2 | * | 7/2008 | Tanaka et al. .............. | 73/204.26 |
| 7,966,877 B2 | * | 6/2011 | Renninger et al. ......... | 73/204.26 |
| 2009/0199632 A1 | * | 8/2009 | Toyoda ...................... | 73/204.26 |

FOREIGN PATENT DOCUMENTS

| | | |
|---|---|---|
| DE | 196 01 791 | 7/1997 |
| DE | 199 41 330 | 10/2000 |
| DE | 199 39 824 | 2/2001 |
| DE | 102 46 069 | 4/2004 |
| DE | 103 48 400 | 2/2005 |
| DE | 10 2005 006 158 | 8/2005 |
| DE | 10 2005 016 122 | 10/2006 |
| DE | 10 2005 016 449 | 10/2006 |
| EP | 1 762 851 | 3/2007 |
| JP | 2000-275076 | 10/2000 |
| JP | 2003-507729 | 2/2003 |
| JP | 2005-227131 | 8/2005 |
| WO | WO 02/10694 | 2/2002 |

* cited by examiner

*Primary Examiner* — Jewel V Thompson
(74) *Attorney, Agent, or Firm* — Kenyon & Kenyon LLP

(57) ABSTRACT

A device for determining at least one parameter of a fluid medium, in particular an intake air mass of an internal combustion engine. The device comprises a sensor chip for measuring the parameter and a control and evaluation electronics having a circuit carrier. The sensor chip is situated on a chip carrier capable of being introduced into the fluid medium. The chip carrier comprises a projection of the circuit carrier developed in one piece with circuit carrier, the sensor chip being fixed in place on the projection.

8 Claims, 3 Drawing Sheets

HOT FILM AIR MASS METER AND METHOD FOR ITS MANUFACTURE

BACKGROUND OF THE INVENTION

1. Field of the Invention

The present invention relates to a device for measuring at least one parameter of a flowing fluid medium through a flow pipe.

2. Description of Related Art

Thus, in many processes, for example in the fields of process engineering, chemistry or machine construction, fluid media, especially gas masses (e.g. an air mass) having particular properties (such as temperature, pressure, flow velocity, mass flow rate, etc.) must be supplied in a defined manner. This includes in particular combustion processes, which run under controlled conditions.

An important example of an application is the combustion of fuel in internal combustion engines of motor vehicles, especially those including a subsequent catalytic exhaust gas purification, in which a specific air mass per unit time (air mass flow) must be supplied in a controlled manner. Various types of sensors are used to measure the air mass throughput. One sensor type known from the related art is the so-called hot film air mass meter (HFM), which is described in one specific embodiment in DE 196 01 791 A1, for example.

Such hot film air mass meters normally use a sensor chip having a thin sensor diaphragm, for example a silicon sensor chip. At least one heating resistor, surrounded by two or more temperature measuring resistors (temperature sensors), is typically disposed on the sensor diaphragm. In an air flow that is routed across the diaphragm there is a change in the temperature distribution, which in turn is detectable by the temperature measuring resistors and may be evaluated with the aid of a control and evaluation circuit. Thus it is possible, for instance, to determine an air mass flow from a difference in resistance of the temperature measuring resistors. Several other variants of this type of sensor are known from the related art, for example sensors that use porous sensor chips instead of diaphragms.

The known hot film air mass meters as well as other known devices for determining at least one parameter of fluid media normally have a chip carrier, onto which or into which the sensor chip is inserted. The chip carrier usually extends into the fluid medium, the chip carrier normally being developed such that when the sensor chip is inserted an essentially smooth surface is formed over which the fluid medium is able to flow without forming turbulences.

In the known hot film air mass meters, for example, the chip carrier is produced in that a sheet metal carrier is used for a control and evaluation electronics, on which a circuit carrier (for example a circuit board) is fastened. The chip carrier itself is normally fastened on the sheet metal carrier by a mounting process, for example by injection molding in an injection molding process.

Following the assembly of the circuit carrier, the sensor chips are then normally mounted on the chip carrier in additional process steps. For this purpose, an adhesive is normally introduced into a receptacle made of metal or plastic, the chip is taken out of a diced-up silicon wafer using an additional handling system, and the chip is positioned within the chip receptacle within the chip carrier.

Subsequently, the adhesive, which may be a silicone adhesive for example, is cured in an oven.

This known manufacturing method and the devices manufactured by them leave room for improvements, however. In particular, numerous individual steps are required for introducing the sensor chip into or onto the chip carrier, which increase the cost of the manufacturing process and thus of the end product or lower the profit margins. Another disadvantage is the fact that the curing of the adhesive in the oven in turn may damage the already assembled electronics and that prior to curing component tolerances may result in that the sensor chip slips out of place on the uncured adhesive due to a normally existing play of the sensor chip within the chip carrier or a depression of the chip carrier.

SUMMARY OF THE INVENTION

Accordingly, a device for determining at least one parameter of a fluid medium is provided, this device for example being a device for determining the intake air mass of an internal combustion engine. Preferably, this device is a hot film air mass meter. Furthermore, a method for manufacturing such a device is provided, in particular for manufacturing a device having the device features according to the present invention.

Like the devices described at the outset, the device according to the present invention has a sensor chip for measuring the parameter. For example, this may be one of the hot film air mass meter chips mentioned at the outset, which may be constructed in accordance with the related art and which may have in particular a heating resistor and two temperature sensors on a sensor surface.

Furthermore, the device of the present invention has a control and evaluation electronics having at least one circuit carrier. This circuit carrier, for example, may again be a circuit board, in particular a ceramic circuit board and/or a circuit board having plastics as material. This control and evaluation electronics also may be constructed as known from the related art for example and may include electronic components for controlling the heating resistor and electronic components for evaluating the temperature sensors for example.

Furthermore, the device again includes a chip carrier, which is used to introduce the sensor chip or the sensor surface of the sensor chip into the fluid medium.

A basic idea of the present invention is to simplify the mounting of the chip carrier significantly compared to the known devices. In particular, using the device provided in the following and a corresponding manufacturing method, the mounting of the chip carrier by injection molding on a sheet metal carrier may be eliminated.

Accordingly, the present invention provides for using the circuit carrier itself or a part of this circuit carrier as an integral part of the chip carrier. For this purpose, the circuit carrier has a projection developed in one piece with the rest of the circuit carrier. This may be an approximately rectangular projection, for example, which is developed out of the rest of the circuit carrier (for example the circuit board) by sawing for example. Preferably, the device is used in such a way that only this projection of the circuit carrier extends into the fluid medium. The sensor chip is fastened on this projection.

This fastening of the sensor chip on the projection may occur for example by an integral connection, in particular by bonding. Particularly preferable is bonding using an adhesive film because such an adhesive film may be applied in a "pick-and-place" method, for example using a commercial circuit board assembly system, and because in this manner curing steps in an oven may be eliminated. As an alternative or in addition to bonding, other methods are also conceivable, however, for example a force-locking and/or a form-locking fastening method.

Furthermore, the chip carrier may comprise a frame, which is mounted on the projection and which encloses the sensor chip at least partially. This frame, for example, may be likewise connected to the projection by one of the types of fastening methods described above, preferably again by an adhesive film. For example, the same adhesive film may be used for this purpose, by which the sensor chip is fastened on the projection.

The frame may comprise a cut-out into which the sensor chip is inserted. This cut-out may be developed in such a way that after the frame is mounted the entire surface of the chip carrier, which is now made up of the frame surface and the sensor chip surface, is essentially flat and flush. Furthermore, the cut-out may be developed in such a way that the sensor chip rests on the projection itself, or the cut-out may only comprise a depression into which the sensor chip is inserted without making contact with the projection.

Furthermore, the frame may additionally comprise flow guide elements suitable for example for guiding a flow of a fluid medium around the sensor carrier and/or to reduce a pressure drop of the fluid medium on the device itself or on the chip carrier. In particular, this flow guide element may comprise a rounded-off flow-impact lip, which in the installed state of the device points counter to the main flow direction of the fluid medium at the location of the chip carrier. This rounded-off flow-impact lip may compensate for example a pressure drop or a formation of turbulence on sharp edges of the projection of the circuit carrier. For this purpose, the flow-impact lip may be developed in particular so as to enclose the projection on a flow-impact side at least partially so that in this region sharp edges of the projection are at least partially covered.

A pick-and-place method known from circuit board technology for example may be used to manufacture the device in one of the specific embodiments described above as well as similar devices. An essential advantage of the described method is the fact that both the assembly of the circuit carrier as well as the mounting of the sensor chip and, if applicable, the frame may be done by adhesive film, it being possible for all components to be mounted preferably using the same handling system or assembly system. Additional process steps such as an application of adhesive and a subsequent curing of an adhesive may be eliminated, in particular if an adhesive film is used. An additional injection molding process onto a sheet metal carrier may be eliminated. The provided device and the provided method are therefore characterized by a significant reduction of the manufacturing steps and of the devices required for the manufacture. This makes it possible to reduce the manufacturing costs significantly and to reduce the cycle times of the manufacture considerably.

BRIEF DESCRIPTION OF THE DRAWINGS

Exemplary embodiments of the present invention are shown in the drawing and explained in greater detail in the following description. The figures show.

DETAILED DESCRIPTION OF THE INVENTION

Figure 1:
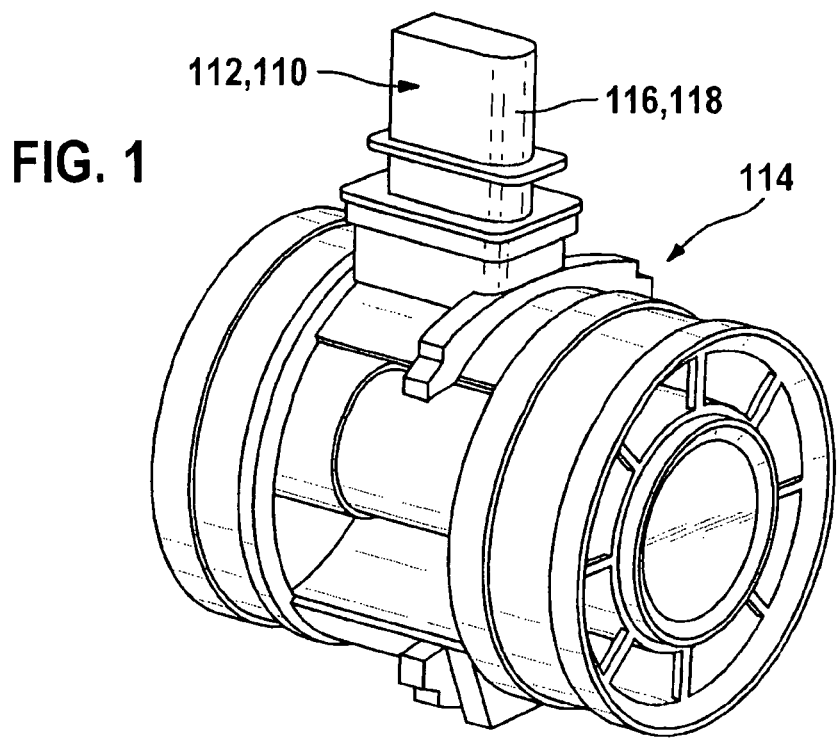
FIG. 1 shows a hot film air mass meter inserted in the intake tract of an internal combustion engine.

FIG. 1 shows an example of a device 110 for determining a parameter of a fluid medium flowing in a main flow direction. In this exemplary embodiment, device 110 is a hot film air mass meter 112, as it is in the following exemplary embodiments as well (without limiting the scope of protection of the present invention), which is used in an intake tract 114 of an internal combustion engine (not shown in FIG. 1). Such hot film air mass meters 112 are commercially available and are described for example in DE 102 46 069 A1 or DE 103 48 400 A1.

Hot film air mass meter 112 is designed to detect the flow direction of an exhaust gas flow in a pulsating flow and is conceived to detect the load in internal combustion engines having gasoline or Diesel fuel injection. Hot film air mass meter 112 is usually installed between an air filter and a throttling device, and it is normally installed as a preassembled module in the form of a plug-in sensor 116 having a measuring housing 118. Usually, such measuring housings 118 are manufactured as injection molded components, usually from technical plastics, which are suitable for the automobile industry. Typical plastics are fiberglass-filled thermoplastics such as PBT, having a fiberglass filling of 20% for example. Other plastics may be used as well.

Figure 2:
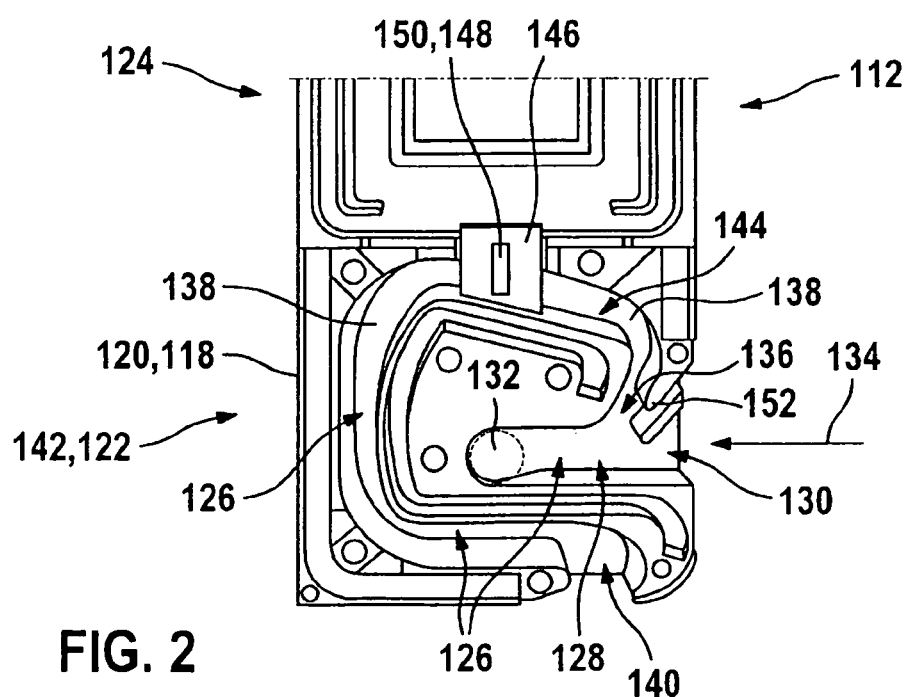
FIG. 2 shows an open hot film air mass meter in a top view.

FIG. 2 shows a top view of hot film air mass meter 112 according to the example from FIG. 1 having an open measuring housing 118. In this instance, a cover part (not shown in FIG. 2) of measuring housing 118 is removed such that the inside of a housing part 120 of measuring housing 118 is visible. Measuring housing 118 is subdivided into a flow region 122 and an electronics region 124. A flow channel 126, which is subdivided into several subchannels, is accommodated in flow region 122, which in the installed state of hot film air mass meter 112 is inserted into intake tract 114, as may be seen in FIG. 1. Thus, flow channel 126 first has a main flow channel 128, which extends from an intake port 130 essentially horizontally and straight to an outlet hole 132.

Outlet hole 132, which is indicated by a dashed line in FIG. 2, is located in the cover part of measuring housing 118, which is not shown in FIG. 2. In the region before outlet hole 132, flow channel 126 or main flow channel 128, which is otherwise designed essentially rectangular in cross section, is beveled having a decreasing channel depth toward outlet 132 such that air is guided from intake port 130 to outlet hole 132. A fluid medium, for example air in intake tract 114, flows against hot film air mass meter 112 in a main flow direction 134, the orientation of hot film air mass meter 112 normally being predefined in such a way that main flow direction 134 is parallel to the course of main flow channel 128.

A junction 136 is located in flow channel 126 directly behind intake port 120. At this junction 136, which is situated at an acute angle with respect to main flow direction 134, a measuring channel 138 branches off from main flow channel 128. Measuring channel 138 follows a curved course and is run around outlet hole 132 of main flow channel 128. Measuring channel 138 eventually opens into a measuring channel outlet hole 140 on the bottom side of housing part 120. Measuring channel 138 is frequently called a "bypass" such that flow region 122 as a whole is often also called bypass part 142.

At junction 136, the air mass flow, which enters into flow channel 126 in main flow direction 134, is split into two partial flows. The first, main partial flow flows directly from intake port 130 to outlet hole 132 through main flow channel 128. A second partial flow is diverted, however, in particular as a result of flow-mechanical underpressure phenomena at junction 136, and is directed into measuring channel 138. This partial flow flowing through measuring channel 138 is representative of the overall flow of the fluid medium, for example air, flowing in main flow direction 134.

A straight section 144 is provided in measuring channel 138, in which a chip carrier 146 having an inserted sensor chip 148 extends from electronics region 124 into measuring channel 138. Sensor chip 148 acts as a sensor element 150 and may be developed according to the principle described above (see e.g. DE 196 01 791 A1) for example.

In the hot film air mass meters 112 known from the related art, chip carrier 146 may be developed as a metal component, for example as a sheet metal component; or it may be a plastic component, for example an injection molded component. Chip carrier 146 is usually fastened (usually by injection-molding) to a sheet metal carrier accommodated in electronic region 124, which is not shown in FIG. 2, the sheet metal carrier supporting the evaluation and a control circuit of hot film air mass meter 112. This sheet metal carrier is explained in more detail below with reference to FIG. 3.

In order to prevent water and other solid or liquid impurities (for example oil), which are carried along by the air, from reaching sensor chip 148, a so-called "tooth" 152 in the form of a sharp edge is provided on junction 136, which extends into intake port 130 and which provides deflection surfaces having a downward component in FIG. 2, i.e. at an acute angle with respect to main flow direction 134. Inflowing air is thereby partially deflected downward, i.e. away from junction 136. This tooth 152 thus ensures a phase separation, i.e. it ensures that the partial flow diverted at junction 136, which flows through measuring channel 138, is essentially free of water and/or other liquid or solid impurities. Dirt and/or water particles are unable to follow the sharp redirection at tooth 152 and on account of their inertia fly straight ahead through main flow channel 128 and leave it by laterally situated outlet hole 132.

Figure 3:
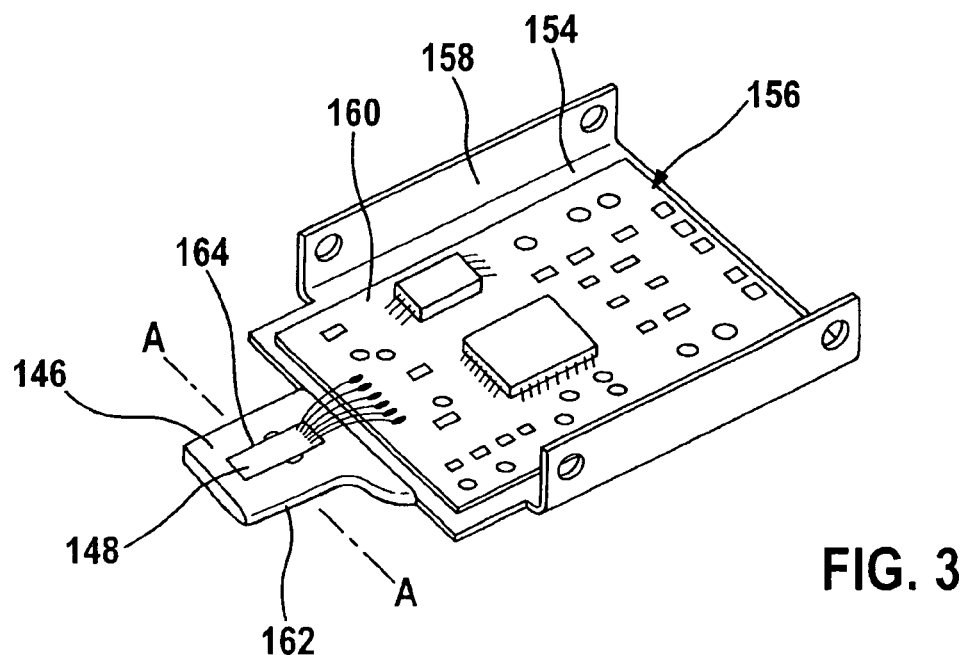
FIG. 3 shows a sheet metal carrier of a hot film air mass meter having a control and evaluation electronics and a chip carrier that is attached by injection molding.

FIG. 3 shows a perspective view of the above-described sheet metal carrier 154 together with a control and evaluation electronics 156 and chip carrier 146. As a stamped-bent part, sheet metal carrier 154 is manufactured from a common sheet metal material and comprises laterally bent mounting supports 158, by which sheet metal carrier 154 may be inserted and fastened in the above-described electronics region 124 of measuring housing 118.

A circuit carrier 160 is mounted on sheet metal carrier 154 as a component of control and evaluation electronics 156, which in the present exemplary embodiment may be a flat, rigid or flexible circuit board, for example a ceramic circuit board. In this exemplary embodiment, using common assembly technologies, circuit carrier 160 is fitted with electronic components, which ensure the functions of control and evaluation electronics 156. Furthermore, circuit traces and contact pads are provided. Circuit carrier 160 may be bonded on sheet metal carrier 154 for example.

In the exemplary embodiment corresponding to the related art and shown in FIG. 3, chip carrier 146 is injection molded onto sheet metal carrier 154 in the usual plastics technology. Chip carrier 146 has a flow-impact edge 162, which in use is directed counter to the main flow direction of the flowing fluid medium in measuring channel 138. This flow-impact edge 162 is rounded off slightly.

Furthermore, chip carrier 146 has a depression 164, which essentially has a rectangular shape, but which laterally has dents into which a pick-and-place tool may engage, and into which sensor chip 148 is inserted. Sensor chip 148 is connected to circuit carrier 160 by wire bonding.

Figure 4:
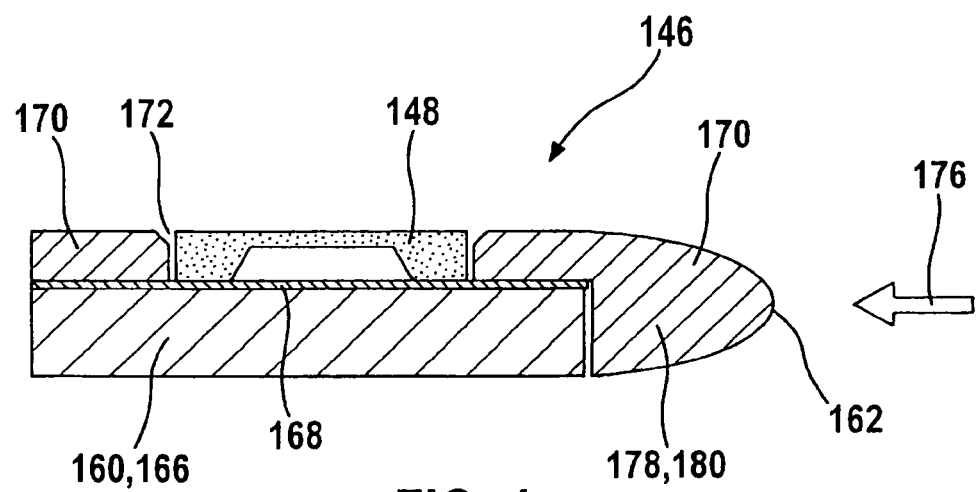
FIG. 4 shows a sectional view of a chip carrier constructed in accordance with the present invention having an inserted sensor chip.
Figure 5:
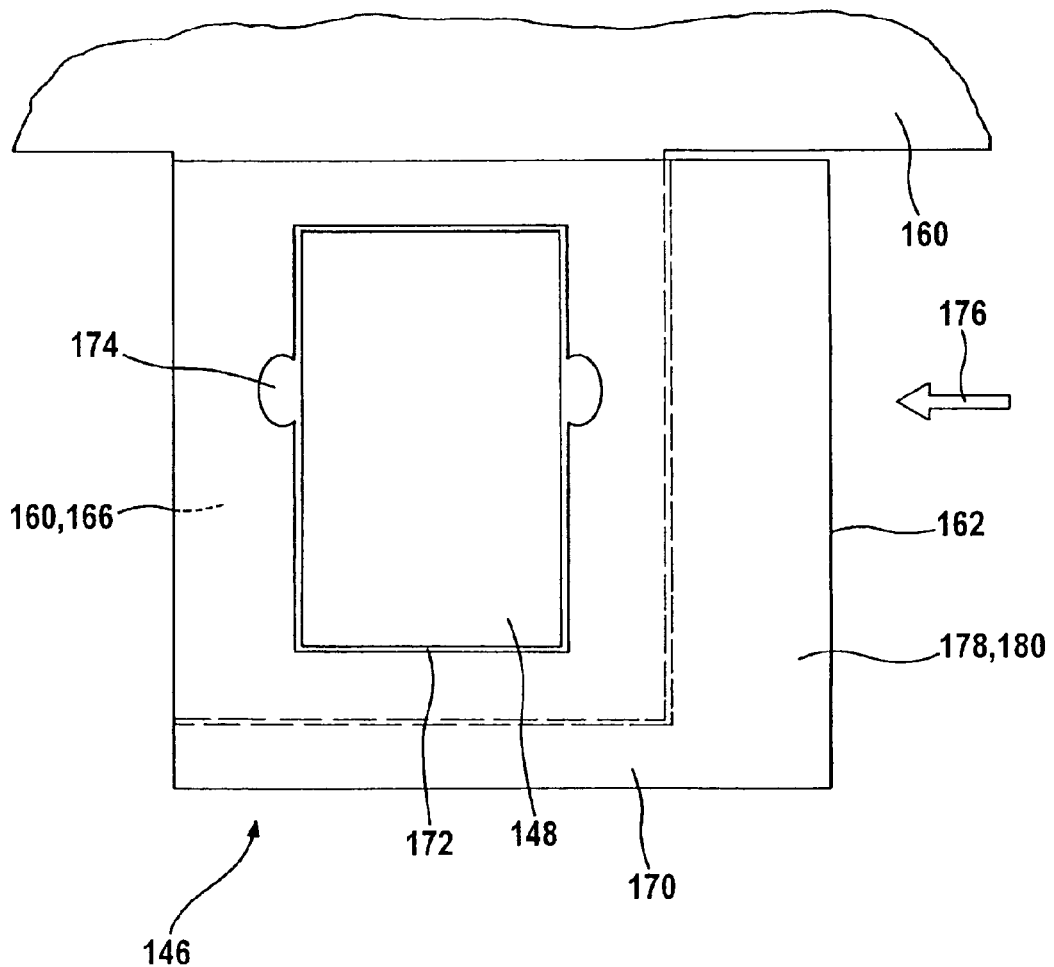
FIG. 5 shows the chip carrier according to the present invention from FIG. 4 in a top view.

In contrast to FIG. 3, FIG. 4 shows a development of a chip carrier 146 in accordance with the present invention. The representation in FIG. 4 is a sectional view along the line A-A in FIG. 3 and shows the differences of the construction according to the present invention compared to the related art. FIG. 5 shows chip carrier 146 according to the present invention in a top view. Both figures are used in the following to explain the device according to the present invention.

In the provided construction, circuit carrier 160 has a rectangular projection 166, which is developed in one piece with the rest of circuit carrier 160, but which extends from electronic region 124 into measuring channel 138 and thus forms part of chip carrier 146.

A double-sided adhesive film 168 is applied on projection 166 in a pick-and-place process. This double-sided adhesive film 168 is preferably developed in one piece and covers the entire surface of projection 166, which projects into measuring channel 138.

Subsequently, a frame 170 is mounted on double-sided adhesive film 168. This frame 170 may be manufactured in advance in a separate injection molding process from a common plastic material, for example from a reinforced or non-reinforces PBT material used in motor vehicle technology (see above). This frame 170 may also be manufactured in panel fashion such that several such frames 170 may be manufactured in a single injection molding process. Likewise using a pick-and-place method, preferably using the same machine by which double-sided adhesive film 168 is applied, frame 170 may be mounted on projection 166 and pressed onto double-sided adhesive tape 168. Additional installation steps are normally not necessary.

Frame 170 has a cut-out 172, which again, in analogy to FIG. 3, may have essentially the shape of sensor chip 148. This may again be a rectangular shape for example, it being possible, however, to provide additional bores or extensions of cut-out 172, in analogy to FIG. 3, in order to facilitate the pick-and-place method or assembly by a corresponding automatic pick-and-place machine. This is indicated schematically in FIG. 5 by the assembly enlargement 174 of cut-out 172.

FIG. 4 shows another special feature of frame 170. Thus, frame 170 not only has cut-out 172, but also has a flow guide element 178 in the form of a rounded-off flow-impact lip 180, which is directed counter to flow direction 176 of the fluid medium in measuring channel 138 at the location of chip carrier 146. This flow-impact lip 180 covers the sharp edge of projection 166, which is directed counter to flow direction 176, and is flush with projection 166 on the side of chip carrier 146 facing away from sensor chip 148. This prevents the formation of turbulences and reduces the pressure drop on chip carrier 146. On its side facing counter to flow direction 176, flow-impact lip 180 is rounded off and thus forms flow-impact edge 162 of chip carrier 146. In addition or as an alternative to the flow-impact lip 180 described in FIGS. 4 and 5, frame 170 may also comprise other types of flow guide elements 178, which optimize the aerodynamics, and which for example may likewise extend in a step beyond projection 166 of circuit carrier 160 in order to cover the edge of projection 166. Thus it is possible for example to accommodate flow wings, flow grooves or similar aerodynamic elements in frame 170.

Following the mounting of frame 170 on projection 166, sensor chip 148, which is shown only schematically in FIG. 5, is mounted on adhesive film 168. This installation may be performed again by a pick-and-place method. Frame 170 is preferably dimensioned in its thickness in such a way that the surface of sensor chip 148 is flush with the surface of frame 170, as shown in FIG. 4. In this manner, turbulences on the edges of sensor chip 148 are avoided, which could arise if the surfaces were not flush (for example if there were a projection and/or a recess).

Subsequently, as shown in FIG. 3 for example, sensor chip 148 may be connected and contacted by a wire bonding method to control and evaluation electronics 156, in particular to circuit carrier 160. In the perspective view at an angle from above, as shown in FIG. 3, and in its function, chip carrier 146 having inserted sensor chip 148 then practically does not differ from the representation in FIG. 3 corresponding to the related art. As described above, however, the manufacturing method is greatly simplified by the method provided, and hot film air mass meter 112 may be manufactured in a substantially more cost-effective way.

What is claimed is:

1. A device for determining at least one parameter of a fluid medium, comprising:
    a sensor chip for measuring the parameter and a control and evaluation electronics having a circuit carrier, the sensor chip being situated on a chip carrier capable of being introduced into the fluid medium, wherein the chip carrier comprises a projection of the circuit carrier developed in one piece with circuit carrier, the sensor chip being fastened on the projection.

2. The device as recited in claim 1, wherein the sensor chip is fastened on the projection by at least one of: integral fastening; bonding; bonding using an adhesive film or a curable adhesive; force-locking fastening; and form-locking fastening.

3. The device as recited in claim 1, wherein the chip carrier further includes a frame, the frame being mounted on the projection and at least partially enclosing the sensor chip.

4. The device as recited in claim 3, wherein the frame is connected to the projection by at least one of: integral fastening; bonding; bonding using an adhesive film or a curable adhesive; force-locking fastening; and form-locking fastening.

5. The device as recited in claim 3, wherein the sensor chip is inserted into a cut-out in the frame.

6. The device as recited in claim 3, wherein the frame includes a flow guide element, which is developed to at least partially enclose the projection on a flow-impact side.

7. The device as recited in claim 6, wherein the flow guide element is a rounded-off flow-impact lip.

8. The device as recited in claim 1, wherein the fluid medium is an intake air mass of an internal combustion engine.

* * * * *

UNITED STATES PATENT AND TRADEMARK OFFICE
CERTIFICATE OF CORRECTION

PATENT NO. : 8,448,508 B2  Page 1 of 1
APPLICATION NO. : 12/451585
DATED : May 28, 2013
INVENTOR(S) : Schneider et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this
Eighth Day of September, 2015

Michelle K. Lee
*Director of the United States Patent and Trademark Office*